United States Patent [19]

Mori et al.

[11] 3,883,554

[45] May 13, 1975

[54] PROCESS FOR PREPARING 5-HYDROXY-TRYPTOPHAN AND ITS DERIVATIVES

[75] Inventors: Yasuki Mori, Kawasaki; Moriyuki Sato, Sapporo, both of Japan

[73] Assignee: Kyowa Hakko Kogyo Co., Ltd., Tokyo, Japan

[22] Filed: May 8, 1973

[21] Appl. No.: 358,518

Related U.S. Application Data

[63] Continuation-in-part of Ser. No. 190,392, Oct. 18, 1971, abandoned.

[30] Foreign Application Priority Data

Oct. 26, 1970 Japan.............................. 45-93459

[52] U.S. Cl. ............... 260/326.14 T; 260/326.11 R

[51] Int. Cl............................................ C07d 27/60
[58] Field of Search ........................... 260/326.14 T

[56] References Cited
OTHER PUBLICATIONS

Sundberg, THE CHEMISTRY OF INDOLES (1970) pp. 308–10.

Primary Examiner—Joseph A. Narcavage
Attorney, Agent, or Firm—Fitzpatrick, Cella, Harper & Scinto

[57] ABSTRACT

5-hydroxytryptophan and its derivatives are prepared by oxidation of 2,3-dihydrotryptophan or its derivatives. 5-hydroxytryptophan is useful as an antioxidant for foodstuffs and medicines.

4 Claims, No Drawings

PROCESS FOR PREPARING 5-HYDROXY-TRYPTOPHAN AND ITS DERIVATIVES

This application is a continuation-in-part of copending application Ser. No. 190,392, filed Oct. 18, 1971, and now abandoned.

This invention relates to a process for preparing 5-hydroxytryptophan and its derivatives.

It is generally known that 5-hydroxy-L-tryptophan is an excellent antioxidant for foodstuffs and medicines. In addition, 5-hydroxy-L-tryptophan has been shown to be useful in the treatment of certain cerebral disorders, in regulating blood pressure and as an anti-depression agent [Lancet, No. 7586, 132(1969); Medicinal Chemistry, 2, 1224(1970); and Chem. Eng. News, 46, 45(1969)]. Various metabolites of 5-hydroxytryptophan and its derivatives, such as serotonin and 5-hydroxyindoleacetic acid, have been shown to possess excellent in vivo pharmaceutical activity.

The known methods for preparing 5-hydroxytryptophan and its derivatives have certain inherent disadvantages. Hydroxylation of an optically active isomer of tryptophan, for example, whether by chemical or enzymatic means, does not result in a selective production of 5-hydroxytryptophan. Instead, a mixture of 5-hydroxytryptophan with other mono-, di- and/or trihydroxylates is obtained. The selective isolation of 5-hydroxytryptophan from the mixture of the hydroxylates is achieved only with great difficulty.

It is also known that 5-hydroxytryptophan can be synthesized from compounds such as p-substituted anilin derivatives which have an ether group such as methoxy or benzyloxy group or compounds having an hydroxyl group at the 5 position of indole. Such syntheses, however, generally involve several steps and result in a racemic mixture and require resolution into the optically active isomers.

Because of these inherent difficulties in the prior art processes, the known methods are not suitable for large scale preparation of 5-hydroxytryptophan and its derivatives. Since these compounds have useful medicinal activity, it is desirable to have a method of producing large quantities of 5-hydroxytryptophan and its derivatives at low cost.

According to the present invention, a method is provided for the synthesis of optically active 5-hydroxytryptophan and its derivatives which avoids some of the disadvantages of the prior art methods.

By the present invention, 5-hydroxytryptophan and its derivatives can be prepared by oxidizing 2,3-dihydrotryptophan compound of the formula:

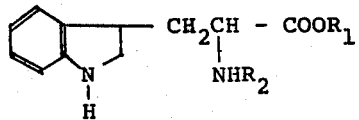

wherein $R_1$ is hydrogen, loweralkyl such as methyl, ethyl, propyl, butyl and the like, and aralkyl such as benzyl, phenethyl and the like; and $R_2$ is hydrogen or an amino protecting group such as a loweralkanoyl or mono- or dihalo- lower alkanoyl group such as acetyl, propionyl, monochloroacetyl, dichloroacetyl, or monofluoroacetyl, aroyl such as benzoyl, substituted aroyl wherein the substituent is one or more of halogen, nitro, lower alkyl and lower alkoxy, aralkyloxycarbonyl such as benzyloxycarbonyl, alkyloxycarbonyl such as t-butyloxycarbonyl, trityl and the like. Suitable oxidizing agents which may be employed for the oxidation step are hydrogen peroxide, potassium nitrosodisulfonate and chromic anhydride.

The oxidation reaction is generally carried out in a solvent at a temperature between −10°C and 60°C, favorably, between 0°C and room temperature. Suitable solvents for the oxidation reaction are water, inorganic acids such as hydrochloric acid and sulfuric acid, organic acids such as acetic acid and propionic acid, alcohols such as methanol and ethanol, and alkyl amines such as dimethylamine. These solvents may be used alone or mixtures of one or more of the solvents may be employed.

The reaction is to be carried out theoretically using 2 equivalents of the oxidizing agent per mole of the starting material. Generally, however, an excess of the oxidizing agent is employed. 2,3-Dihydrotryptophan and its derivatives are oxidized to 5-hydroxytryptophan and its derivatives via the intermediate of iminoquinone form (I), which are spontaneously converted to 5-hydroxytryptophan and its derivatives (II) through proton migration.

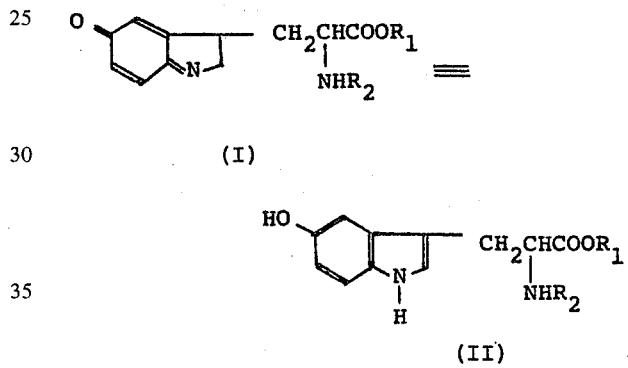

Although the oxidation reaction is essentially complete after the addition of the oxidizing agent, additional time for the reaction is generally allowed in order to ensure complete oxidation of the starting material.

Where the starting material is 2,3-dihydrotryptophan, the product of the oxidation is 5-hydroxytryptophan. The product can be purified by techniques known in the art such as, for example, recrystallization or by the various known chromatographic methods.

Where the starting material is an ester of 2,3-dihydrotryptophan, the product is an ester of 5-hydroxytryptophan; the ester derivatives can be converted to 5-hydroxytryptophan by any of the known hydrolysis techniques used in the preparation of amino acids from the corresponding ester. For example, the ester group can be removed by acid hydrolysis with dilute hydrochloric acid. Catalytic reduction with hydrogen can also be employed to remove aralkyl ester groups such as the benzyl group.

Although 5-hydroxytryptophan and its derivatives can be prepared by the oxidation process of this invention, it is within the contemplation of the invention that some of the derivatives can be converted to other derivatives within the scope of the invention by general techniques known in the art such as hydrolysis or reduction.

Where the starting material contains an amino protecting group such as, for example, an acetyl group or a t-butyloxycarbonyl group, the protecting group can be removed by any of the techniques known in the art for removing amino protecting groups. For example, where the protecting group is acetyl, the protecting group can be removed by treating the N-acetyl compound with dilute acid such as dilute hydrochloric acid, for example. In addition, the protecting group can be removed by enzymatic hydrolysis with, for example, acylase.

Where the 5-hydroxytryptophan derivative contains an ester group such as a benzyl group, for example, and/or an amino protecting group such as, for example, a benzyloxycarbonyl group, both groups can be removed simultaneously by catalytic reduction with hydrogen.

Oxidation of the 2,3-dihydrotryptophan and its derivatives, according to the present invention, occurs without any accompanying inversion at the $\alpha$-position of the amino acid side chain. Accordingly, where a D or L isomer is used as the starting material, 5-hydroxy-D-tryptophan or 5-hydroxy-L-tryptophan is obtained.

The following examples are illustrative embodiments of the invention.

EXAMPLE 1

5.0 g of L-tryptophan is dissolved in 100 ml of 1N aqueous hydrochloric acid. The resultant aqueous solution is hydrogenated in the presence of 0.1 g of platinum oxide as the catalyst. After the theoretical amount of hydrogen is absorbed, the catalyst is filtered off and the pH of the solution is adjusted to about neutral with sodium hydroxide.

To the aqueous solution of 2,3-dihydrotryptophan thus obtained, a solution of 13.8 g of potassium nitrosodisulfonate in 600 ml of water is added dropwise with stirring at room temperature. After the addition is complete, the mixture is stirred for 30 minutes at room temperature. The reaction mixture is passed through an alumina column to remove by-products. The alumina-treated reaction solution is then passed through a column of POROUS POLYMER HP-10 (a nonion exchange resin of a porous co-polymer of styrene and divinylbenzene — Mitsubishi Chemical Ind. Ltd.). The column is eluted with water and 5-hydroxy-L-tryptophan is obtained in the first eluates. The first eluates are collected and upon removal of the solvent, 1.2 g of 5-hydroxy-L-tryptophan is obtained. The 5-hydroxy-L-tryptophan thus obtained is compared with a known sample of 5-hydroxy-L-tryptophan by means of paper chromatography, thin layer chromatography, infrared absorption spectra, ultraviolet absorption spectra, NMR spectra and melting point. The optical rotation of the product $[\alpha]$ (25/D) is $-32.3°$ ($C=1$, water).

EXAMPLE 2

The procedure described in Example 1 is repeated except using 0.816 g of L-tryptophan and a solution of 3.7 g of potassium nitrosodisulfonate in 120 ml of water. As the result, 0.098 g of 5-hydroxy-L-tryptophan is obtained.

Practice of the invention, as presently contemplated by the inventors, is further illustrated by the following additional examples.

EXAMPLE 3

5.0 g of the DL-form of the N-benzyloxycarbonyl benzyl ester of 2,3-dihydrotryptophan is dissolved in a solution of 100 ml of acetic acid and 0.1 ml of concentrated sulfuric acid. 2.5 ml of 30% aqueous hydrogen peroxide is added dropwise to the resultant solution with cooling. After the addition is complete, the stirring is continued at 18°C for 30 minutes, after which the mixture is allowed to stand at room temperature for about 12 hrs. The mixture is then diluted with 500 ml of water and the aqueous solution is extracted several times with 1,000 ml of ether in total. The ether layers are combined and washed first with water, then a saturated aqueous solution of sodium bicarbonate, and again with water. The ether extract is dried over magnesium sulfate and upon distillation of the solvent, 3 g of a mixture of the benzyl esters of N-benzyloxycarbonyl-5-hydroxy-DL-tryptophan and N-benzyloxycarbonyl-DL-tryptophan is obtained. The mixture is dissolved in 300 ml of methanol and the resultant solution is reduced catalytically with hydrogen in the presence of 0.5 g of 5% palladium-activated carbon catalyst. The catalyst is filtered off and upon removal of the solvent, a mixture of 5-hydroxy-DL-tryptophan and DL-tryptophan is obtained. The mixture is dissolved in 200 ml of water and the resulting solution is passed through a column of POROUS POLYMER HP-10. The column is eluted with water and 5-hydroxy-DL-tryptophan is obtained in the first eluates, and DL-tryptophan is obtained in the later eluates. Each group of eluates is collected and upon removal of the solvent from each eluate, 1.3 g of DL-tryptophan and 0.4 g of 5-hydroxy-DL-tryptophan are obtained.

The 5-hydroxy-DL-tryptophan thus obtained is compared with a known sample of 5-hydroxy-DL-tryptophan by means of paper chromatography, thin layer chromatography, infrared absorption spectra, ultraviolet absorption spectra, nuclear magnetic resonace spectra, and melting point.

EXAMPLE 4

5.0 g of N-acetyl-2,3-dihydro-L-tryptophan is dissolved in 100 ml of acetic acid and to the resultant solution is added at 18°C with stirring, a solution of 4 g of chromic anhydride in 5 ml of water and 20 ml of acetic acid. After the addition is complete, the stirring is continued for 30 minutes. The reaction mixture is then diluted with 500 ml of water and the aqueous solution is passed through a column of POROUS POLYMER HP-10. The column is eluted with water. Acetic acid and the inorganic salt are obtained in the first eluates followed by N-acetyl-5-hydroxy-L-tryptophan, and finally, N-acetyl-L-tryptophan. The fractions containing N-acetyl-5-hydroxy-L-tryptophan are collected and concentrated. The concentrate is dissolved in 100 ml of dilute hydrochloric acid and heated at 80°C for 45 min. Upon removal of the aqueous acid, 5-hydroxy-L-tryptophan is obtained as a light brown colored compound. Upon recrystallization of the residue from water, 0.40 g of pure 5-hydroxy-L-tryptophan is obtained. The product is identified in the same manner as in Example 1 above.

When in the above procedure deacetylation is achieved by means of the enzyme Acylase Amano (an acylase — Amano Seiyaku Ind. Ltd.), 0.48 g of pure 5-hydroxy-L-tryptophan is obtained after recrystallization.

EXAMPLE 5

3.0 g of N-acetyl-2,3-dihydro-L-tryptophan is dissolved in a solution containing 10 ml of water, 10 ml of methanol, and 1 ml of dimethylamine. A solution of 8.3 g of potassium nitrosodisulfonate in 350 ml of water is added dropwise with stirring to the resultant solution at room temperature. After the addition is complete, the stirring is continued for 30 minutes. The reaction mixture is then diluted with 300 ml of water and the aqueous solution is passed through a column of the OH form of the basic anion exchange resin DIAION SA-11B (basic anion exchange resin of a co-polymer of divinylbenzene and styrene, of which benzene nuclei are substituted with quaternary ammonium radicals as functional group — Mitsubishi Chemical Ind. Ltd.). The column is first washed with water and then eluted with 2N aqueous hydrochloric acid. The acidic eluates are combined and passed through a column of POROUS POLYMER HP-10 and the column is eluted with water. The inorganic salt is contained in the first eluates followed by N-acetyl-5-hydroxy-L-tryprophan, and finally, by N-acetyl-L-tryptophan. The fractions containing N-acetyl-5-hydroxy-L-tryprophan are collected and concentrated. The concentrate is dissolved in 120 ml of dilute hydrochloric acid and heated at 80°C for 45 minutes, and upon removal of the aqueous acid, 5-hydroxy-L-tryptophan is obtained as a light brown compound. Upon recrystallization of the residue from water, 0.60 g of 5-hydroxy-L-tryptophan is obtained. The product is identified in the same manner as in Example 1 above.

What is claimed is:

1. A process for the preparation of a compound of the formula:

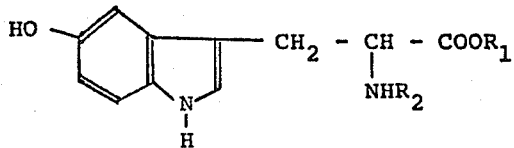

which comprises oxidizing a compound of the formula:

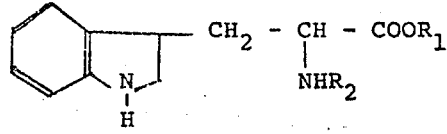

wherein $R_1$ represents hydrogen, alkyl of 1 to 4 carbon atoms, benzyl or phenethyl; $R_2$ represents hydrogen, acetyl, propionyl, mono- or di-haloacetyl, benzoyl, mono- or di-substituted benzoyl, said substituent being selected from the group consisting of halogen, nitro, loweralkyl and loweralkoxy, benzyloxycarbonyl, t-butyloxycarbonyl or trityl; with an oxidizing agent selected from the group consisting of hydrogen peroxide, chromic anhydride and potassium nitrosodisulfonate, in a solvent selected from the group consisting of water, inorganic acids, organic acids, alcohols, alkylamines and mixtures thereof, at a temperature of from $-10°C$ to $60°C$.

2. A process for the preparation of a compound of the formula:

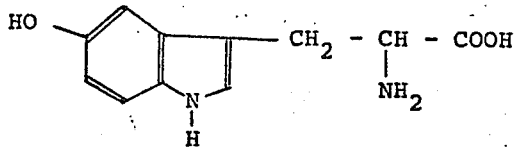

which comprises oxidizing a compound of the formula:

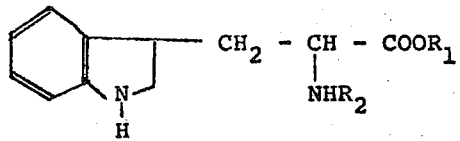

wherein $R_1$ represents hydrogen, alkyl of 1 to 4 carbon atoms, benzyl or phenethyl; $R_2$ represents hydrogen, acetyl, propionyl, mono- or di-haloacetyl, benzoyl, mono- or di-substituted benzoyl, said substituent being selected from the group consisting of halogen, nitro, loweralkyl and loweralkoxy, benzyloxycarbonyl, t-butyloxycarbonyl or trityl; with an oxidizing agent selected from the group consisting of hydrogen peroxide, chromic anhydride and potassium nitrosodisulfonate, in a solvent selected from the group consisting of water, inorganic acids, organic acids, alcohols, alkylamines and mixtures thereof, at a temperature of from $-10°C$ to $60°C$., and hydrolyzing the product formed.

3. The process for the preparation of 5-hydroxy-L-tryptophan which comprises oxidizing 2,3-dihydrotryptophan with potassium nitrosodisulfonate in water at room temperature.

4. The process of claim 2 wherein the hydrolysis is carried out with dilute acid.

* * * * *